United States Patent
MacBean

(10) Patent No.: US 7,741,991 B1
(45) Date of Patent: Jun. 22, 2010

(54) RADAR TRACKING SYSTEM

(75) Inventor: Peter James MacBean, London (GB)

(73) Assignee: MBDA UK Limited, Herfordshire (GB)

( * ) Notice: Subject to any disclaimer, the term of this patent is extended or adjusted under 35 U.S.C. 154(b) by 0 days.

(21) Appl. No.: 07/075,673

(22) Filed: Jun. 26, 1987

(51) Int. Cl.
 *G01S 13/72* (2006.01)

(52) U.S. Cl. .......................... 342/62; 342/97; 342/141; 342/146

(58) Field of Classification Search .............. 342/62, 342/63, 81, 90, 95–97, 106, 139–141, 146, 342/147
See application file for complete search history.

(56) References Cited

U.S. PATENT DOCUMENTS

| | | | | |
|---|---|---|---|---|
| 3,924,824 A | | 12/1975 | Brodie et al. ................. 244/3.2 |
| 4,037,202 A | | 7/1977 | Terzian ....................... 364/200 |
| 4,179,696 A | * | 12/1979 | Quesinberry et al. .......... 342/75 |
| 4,442,431 A | * | 4/1984 | Bleakney ............... 244/3.19 X |
| 4,494,202 A | * | 1/1985 | Yueh .......................... 701/302 |
| 4,502,650 A | * | 3/1985 | Yueh .......................... 244/3.15 |
| 4,589,610 A | * | 5/1986 | Schmidt ..................... 244/3.19 |
| 4,673,938 A | * | 6/1987 | Phillips et al. ................ 342/95 |
| 4,783,744 A | * | 11/1988 | Yueh .......................... 701/221 |
| 7,053,815 B1 | * | 5/2006 | Joynson et al. ................ 342/62 |

FOREIGN PATENT DOCUMENTS

| | | | | |
|---|---|---|---|---|
| GB | 2388985 A | * | 11/2003 |
| GB | 2439772 A | * | 1/2008 |
| GB | 2439987 A | * | 1/2008 |

* cited by examiner

*Primary Examiner*—John B Sotomayor
(74) *Attorney, Agent, or Firm*—Scully, Scott, Murphy & Presser, P.C.

(57) ABSTRACT

An angle tracking radar system particularly for a missile with a steerable antenna and gyros strapped down to the missile body—a 'partially strapdown' system. The body rate signals, body acceleration signals where provided, and target position signals are converted into an electronic reference frame which is controlled to align with the target sightline, the above body and target signals being employed to produce estimates of target direction, sightline rate and sightline acceleration for use in controlling the missile.

7 Claims, 5 Drawing Sheets

SCHEMATIC DIAGRAM OF MISSILE WITH A PARTIALLY STRAPDOWN ANTENNA

SCHEMATIC DIAGRAM OF MISSILE WITH A PARTIALLY STRAPDOWN ANTENNA

Fig.2. BLOCK DIAGRAM OF TYPICAL RECEIVER

BLOCK DIAGRAM OF ANGLE TRACKING ESTIMATOR

BLOCK DIAGRAM OF ANGLE TRACKING ESTIMATOR WITH GYRO SCALE FACTOR CORRECTION

RADAR TRACKING SYSTEM

BACKGROUND OF THE INVENTION

This invention relates to tracking systems for radar guided homing missiles. While it is applicable to systems having fixed antennas with electronic beam steering, it is primarily intended for partially strapdown systems, i.e., systems in which a gimbal mounted antenna is stabilised in space by means of gyroscopes strapped down, i.e., fixed, to the body of the missile, as compared to the more conventional gimbal systems where gyros are mounted directly on the antenna.

SUMMARY OF THE INVENTION

The object of the present invention is the improvement in the estimation of target direction, i.e., sightline, and sightline angular velocity, i.e., 'rate', for an angle tracking system using other than a directly space stabilized antenna.

The addition of stabilizing gyros to a gimbal mounted antenna increases the antenna inertia considerably and so worsens the response, particularly in the presence of highly manoeuvrable targets.

According to the present invention, in an angle tracking radar system for a target-seeking missile having a steerable beam antenna, the system comprising a receiver responsive to target signals received by the antenna to provide receiver output signals indicative of target direction, processing means including a recursive estimator, an inertial reference unit fixed relative to the body of the missile, the processing means being responsive to the receiver output signals and to body rate signals produced by the inertial reference unit to provide an estimate of target sightline direction and angular velocity for guiding the missile and steering the antenna beam onto the target, the processing means is adapted to convert the body rate signals and the receiver output signals into signals in an electronic frame having orthogonal coordinates which are controlled in dependence upon the body rate signals and the sightline angular velocity estimate to produce alignment of one of the coordinates and the estimated sightline, and the estimates of sightline and angular velocity are derived in the electronic frame coordinates preparatory to missile guidance control.

The antenna may be gimbal mounted and the target sightline estimate used to control the antenna to tend to align the antenna boresight and the sightline estimate.

The inertial reference unit preferably includes accelerometer means to measure the missile body acceleration, the recursive estimator, comprising a seven state extended Kalman filter, then being responsive to the measured body acceleration to provide an estimate of target acceleration for use in guiding the missile.

Where the inertial reference unit consists of rate gyros i.e., without accelerometers, the estimator may comprise a five state extended Kalman filter.

Where the inertial reference unit comprises pitch and yaw rate gyros, the body rate signal produced by the inertial reference unit may be deemed to include scale factor error components in respect of the gyros, and the estimator may then comprise a Kalman filter of which the scale factor error components constitute two state vectors.

The receiver output signals may be deemed to include receiver scale factor and radome aberration error components, the estimator then comprising a Kalman filter of which the receiver and radome error components constitute two state vectors.

BRIEF DESCRIPTION OF THE DRAWINGS

An angle tracking radar system in accordance with the invention will now be described, by way of example, with reference to the accompanying drawings, of which.

DETAILED DESCRIPTION OF THE PREFERRED EMBODIMENT

Figure 1:
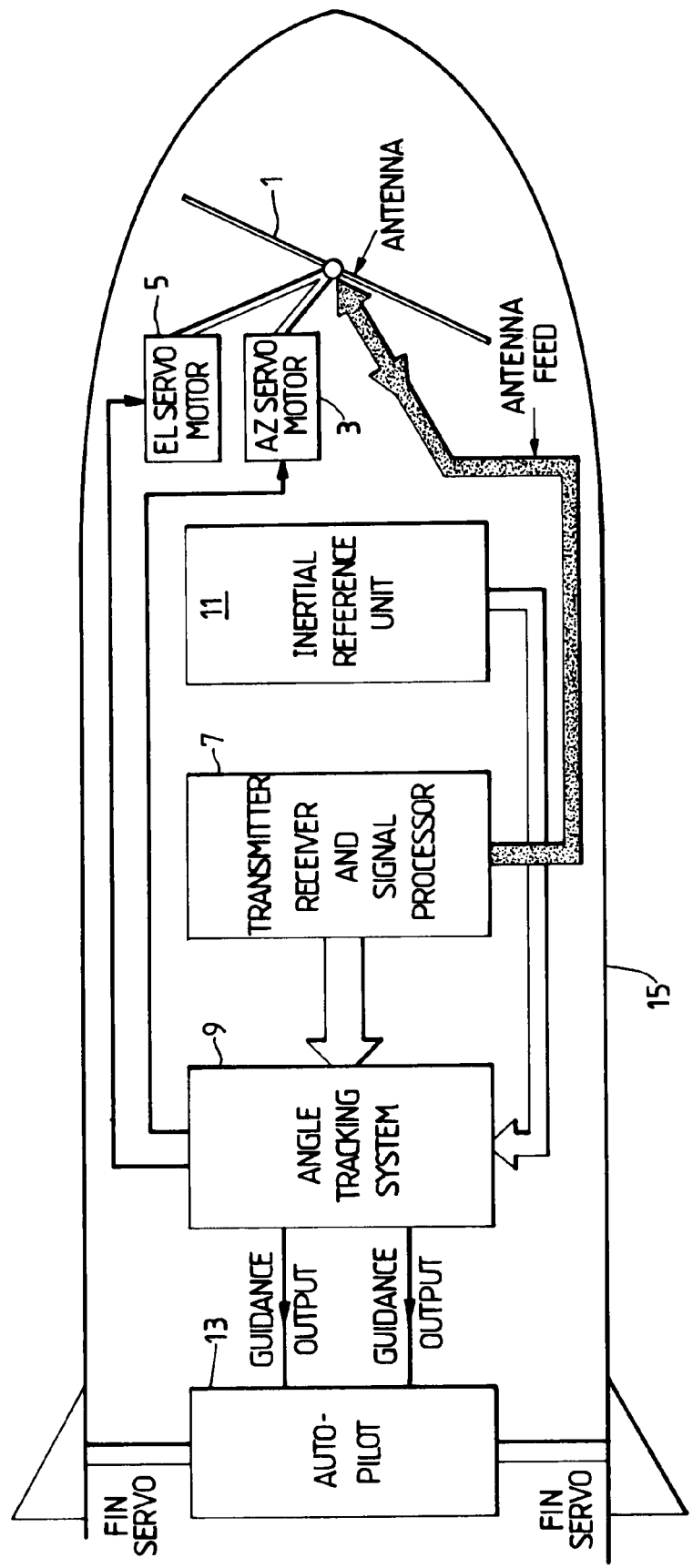
FIG. 1 is a schematic diagram of a missile controlled by a partially strapdown seeker system.

Referring to the seeker system shown in FIG. 1, the principal elements of the system are:
  (a) gimballed antenna 1 and associated servo system 3 & 5;
  (b) transmitter/receiver 7;
  (c) electronic angle tracking system 9 including a recursive estimator;
  (d) strapdown inertial reference unit 11; and
  (e) guidance unit 13.

The function of each of these elements is described below.

Gimballed Antenna and Servo System

The antenna 1 is of a two axis gimballed design. Servo motors 3 & 5 are driven to cause the antenna to track the target in azimuth and elevation. The outer gimbal is driven relative to the body 15, and the inner relative to the outer gimbal using angle demands obtained from the angle tracking estimator (see later).

The most important feature of the antenna is that there are no rate gyroscopes mounted on the antenna to measure the angular velocity of the antenna. The mass and inertia of the gimbal mechanism is thus low and therefore the antenna is capable of tracking at large angular rates.

Transmitter, Receiver and Electronic Angle Tracking

The details of the transmitter and receiver are not of prime importance providing they are suitable for an active radar system. However, a specific design of receiver, employing electronic angle tracking, is assumed, by way of example. Although not essential to the overall angle tracking system, this design has known practical advantages.

Figure 2:
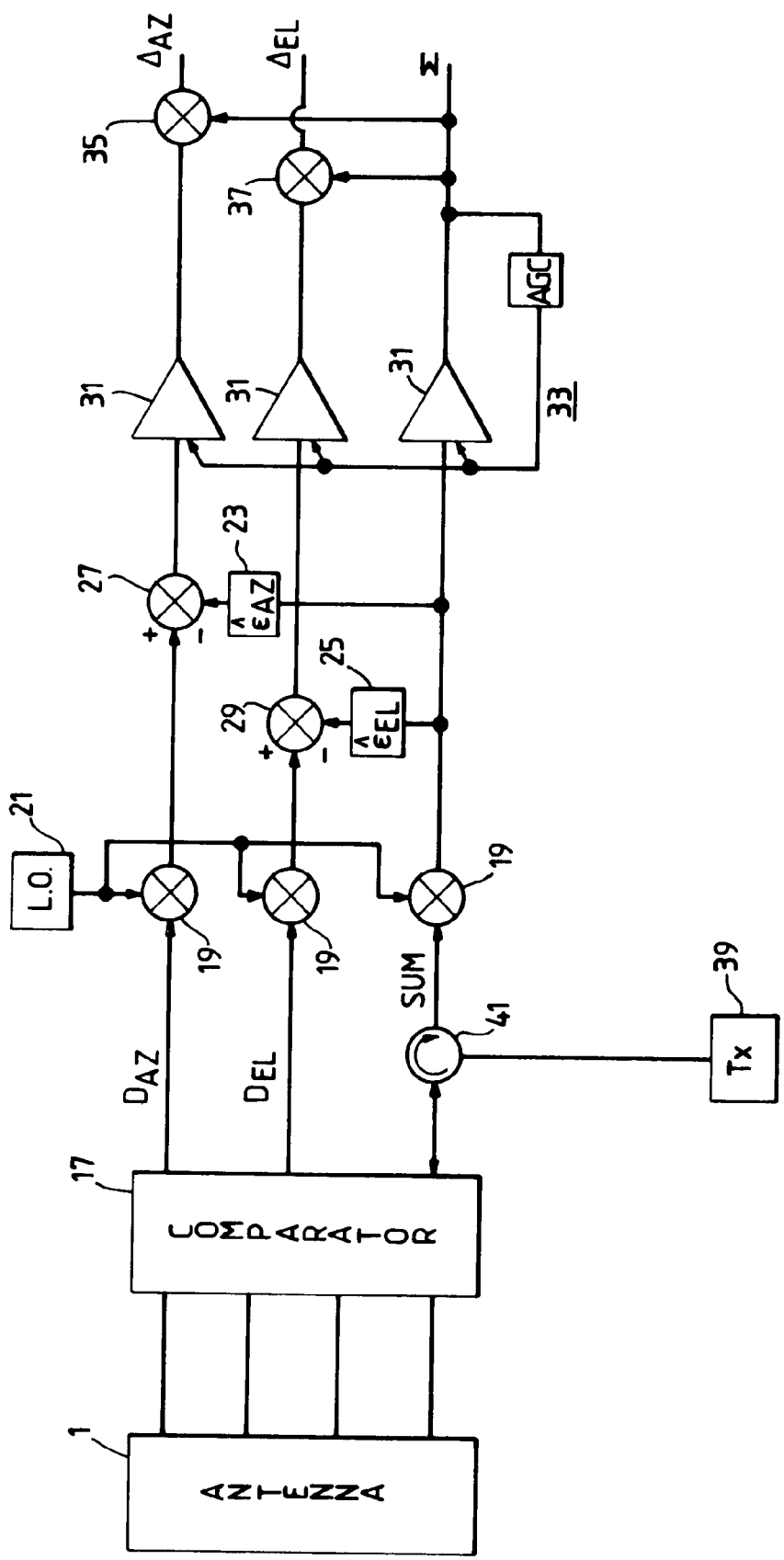
FIG. 2 is a diagram of a radar receiver and transmitter for the seeker.

FIG. 2 shows the arrangement of a typical receiver and transmitter. The antenna 1 is designed for monopulse operation, having four separate quadrants which are fed into the comparator 17 to form a sum signal, an azimuth difference signal and an elevation difference signal. The three channels are mixed down to an intermediate frequency by means of mixers 19 and a local oscillator 21. Electronic angle tracking (EAT) elements 23 & 25 take the sum signal, multiply by $\hat{E}_{AZ}$ and $\hat{E}_{EL}$ and subtract this signal from the azimuth and elevation channels in difference circuits 27 & 29 respectively. ($\hat{E}_{AZ}$ and $\hat{E}_{EL}$ are the estimated values of the difference to sum ratio i.e. the boresight errors. The resulting difference IF channel signals are $$D - \hat{E}S$$

which is zero when the estimates of the boresight error is correct).

The three channels are then amplified (31) by an automatic gain control (a.g.c.) system 33 operating off the sum channel detector, phase sensitive detectors 35 & 37 generating the receiver output.

The azimuth psd output is given by:

$$\frac{S}{\bar{S}} \frac{D_{AZ} - \hat{\varepsilon}_{AZ} S}{\bar{S}}$$

where S is the mean value of S.

A similar expression exists for the elevation output.

The transmitter 39 is coupled into the antenna via a circulator 41 in the sum channel.

Range and velocity tracking systems are included in the seeker but are not shown on the diagram since any of the standard techniques are satisfactory for the purposes of this invention. A further requirement is a system for measuring the signal to noise ratio. This may be achieved in several ways e.g., monitoring the agc level or examining the received spectrum in the receiver.

Summarizing, the receiver gives the following outputs:
(i) Azimuth Receiver output
(ii) Elevation Receiver output
(iii) Missile-target range
(iv) Missile-target closing velocity
(v) Signal-to-noise ratio Angle Tracking Estimator The principal functions of the angle tracking estimator are:
estimation of the target direction $i_s$
estimation of the missile/target sightline rate $\omega_s$
estimation of the target acceleration normal to the sightline $A_T$
estimation of the inertial reference sensor characteristics Inertial Reference Unit The IRU consists of three rate gyroscopes and three accelerometers. The IRU is fixed to the missile body and measures the angular velocity of the missile with respect to inertial space and the non field specific force. The gyroscopes are essential to the angle tracking design but an angle tracking estimator may be constructed which does not require measured body acceleration.

Guidance Unit

The guidance unit has as its inputs the estimates of target direction, sightline rate and target acceleration normal to the sightline. The details of the guidance unit will depend on the particular application but typically the outputs of the unit will be autopilot commands.

Angle Tracking Filter Design

The main features of the angle tracking system are:
(a) target direction estimation.
(b) sightline rate estimation.
(c) target acceleration normal to the sightline estimation.

In addition the angle tracking system can be extended to include:
(d) identification of the strapdown gyros scale factor errors.
(e) identification of receiver errors.

As mentioned above, Electronic Angle Tracking (E.A.T.) is not essential to the design, but for the purposes of this description it will be assumed that an EAT receiver is used.

The output of an EAT receiver is a measure of the difference between the true and estimated target direction. The azimuth differential error $\Delta_{az}$ may be written as $$\Delta az = f(\underline{i}_s \cdot \underline{i}_a - \hat{\underline{i}}_s \cdot \underline{i}_a) + v \quad (1)$$

where
$\underline{i}_s$ is a unit vector along the true missile-target sightline
$\hat{\underline{i}}_s$ is an estimate of $\underline{i}_s$, derived in the angle tracking filter
$\underline{i}_a$ is a unit vector along the azimuth antenna direction
f is a non linear function defined by the D/S pattern of the antenna
is corrupting noise including both thermal and glint effects.

Similarly, the elevation differential error $\Delta_{EL}$ is $$\Delta_{EL} = f(\underline{i}_s \cdot \underline{k}_a - \hat{\underline{i}}_s \cdot \underline{k}_a) + \omega \quad (2)$$

where $\underline{k}_a$ is a unit vector along the elevation antenna direction. For small angular errors the function f is approximately unity and:

$$\Delta_{AZ} = (\underline{i}_s \cdot \underline{i}_a - \hat{\underline{i}}_s \cdot \underline{i}_a) + v$$

$$\Delta_{EL} = (\underline{i}_s \cdot \underline{k}_a - \hat{\underline{i}}_s \cdot \underline{k}_a) + \omega \quad (3)$$

The design of the angle tracking estimator is based on the use of an artificial, electronic axes system, known as the 'e' frame, which is controlled using the measured body rate and the estimated sightline rate to remain in close alignment with the sightline frame. The sightline is defined by three unit vectors, one ($\underline{i}_s$) pointing along the missile-target sightline and the other two forming the triad of vectors. The electronic 'e' frame is defined by a triad of vectors $e_\mu$, $\mu=1,2,3$. These 'e' vectors can be written in terms of a triad of vectors $\underline{i}$, $\underline{j}$ & $\underline{k}$ which define the missile's roll, pitch and yaw axes, i.e., the 'body frame'.

$$e_1 = E_{11}\underline{i} + E_{12}\underline{j} + E_{13}\underline{k}$$

$$e_2 = E_{21}\underline{i} + E_{22}\underline{j} + E_{23}\underline{k}$$

$$e_3 = E_{31}\underline{i} + E_{32}\underline{j} + E_{33}\underline{k} \quad (4)$$

or $$\begin{bmatrix} e_1 \\ e_2 \\ e_3 \end{bmatrix} = E \begin{bmatrix} \underline{i} \\ \underline{j} \\ \underline{k} \end{bmatrix}$$

'e' FRAME       BODY FRAME where E is the direction cosine matrix which represents the transformation from the body frame to the electronic e frame. Thus, a vector $\underline{V}^B$ in the body axes is related to the same vector $\underline{V}^e$ in the electronic frame by the equations $$\underline{V}^e = E \underline{V}^B$$

The time evolution of the e frame is governed by the following differential equations.

$$\frac{\partial e_\mu}{\partial t} = (\hat{\omega}_S^B - \overline{\omega}_B^B) \times e_\mu \text{ for } \mu = 1, 2, 3 \quad (5)$$

where
$\hat{\omega}_S^B$ is an estimate of the angular velocity of the sightline (i.e., the sightline rate) wrt inertial space but in body frame components.
$\hat{\omega}_B^B$ is the measured body rate wrt inertial space but in body frame components.

X denotes vector cross product

There are nine differential equations to solve for the $\underline{e}$ vectors. Fortunately since the vector $\underline{e}_3$ can be expressed as:

$$\underline{e}_3 = \underline{e}_1 \times \underline{e}_2 \tag{6}$$

the number of differential equations that need to be solved is reduced to six. The 'e' frame is initially aligned with the antenna system using the measured azimuth and elevation gimbal angles $\psi_g$, $B_g$ $$\underline{e}_1(0) = [\cos\theta_g \cos\psi_g, \cos\theta_g \sin\psi_g, -\sin\theta_g]$$

$$\underline{e}_2(0) = [-\sin\psi_g, \cos\psi_g, 0] \tag{7}$$

$$\underline{e}_3(0) = [\sin\theta_g \cos\psi_g, \sin\theta_g \sin\psi_g, \cos\theta_g]$$

The e frame, being derived from the estimated sightline rate and the measured body rate, will rotate with respect to inertial space with an angular velocity $\hat{\underline{\omega}}$, provided that the measured body rate is an accurate measure of the true body rate, i.e., that the gyro outputs are accurate. The modifications required to the estimator if this assumption is false will be explained later.

The equations describing the motion of the sightline relative to the 'e' frame (ideally zero) are:

$$\frac{\partial \underline{i}_s^e}{\partial t} + \hat{\underline{\omega}}_s^e \times \underline{i}_s^e = \underline{\omega}_s^e \times \underline{i}_s^e \tag{8}$$

$\hat{\underline{\omega}}^e$ is the estimated sightline rate in e frame coordinates.
$\underline{\omega}^e$ is the true sightline rate in e frame coordinates.

$$\frac{\partial}{\partial t}$$

is a differential operator acting in the e frame

The differential equations for sightline rate are defined as $$\frac{\partial \underline{\omega}^e}{\partial t} = -\hat{\underline{\omega}}_s^e \times \underline{\omega}_s^e - \frac{2\dot{R}}{R}\underline{\omega}_s^e + \frac{\underline{A}^e \times \underline{i}_s^e}{R} \tag{9}$$

where
$\underline{\omega}_s^e$ is the sightline angular velocity
$\hat{\underline{\omega}}_s^e$ is the estimate of the sightline angular velocity
$\underline{A}^e$ is the missile-to-target relative acceleration $= \underline{A}_B^e - \underline{A}_T^e$
$\dot{R}$ is the range rate
$R$ is the separation range Past experience suggests that the following model of target acceleration normal to the sightline is suitable for most applications $$\frac{\partial}{\partial t}\underline{A}_T^e = \hat{\underline{\omega}}_s^e \times \underline{A}_T^e + \underline{n}_T \tag{10}$$

where
$\underline{A}_T^e$ is the target acceleration vector normal to the sightline
$\underline{n}_T$ is a vector of gaussian random variables with zero mean
and
spectral density Q defined by $$E[\underline{n}_T(t)\underline{n}_1(s)] = Q_{A_T}(\delta(t,s)) \tag{11}$$

Since the 'e' frame is in close alignment with the sightline frame, in the 'e' frame:
the sightline vector $\underline{i}_s^e = [l^e, m^e, n^e]$
the sightline rate vector $\underline{\omega}_s^e = [p_s^e, q_s^e, r_s^e] \cong [0, q_s^e, r_s^e]$
the target acceleration vector $\underline{A}_T^e = [A_{Tx}^e, A_{Ty}^e, A_{Tz}^e] [0, A_{Ty}^e, A_{Tz}^e]$ These three quantities are therefore functions of 3, 2 & 2 'states' respectively, and using the above equations a seven state extended Kalman Filter may be defined, based on the following equations derived from equations (8), (9) & (10) above by substituting estimates for true values.

$$\left. \begin{array}{l} \frac{\partial}{\partial t}\overline{\underline{i}}_s^e = \underline{0} + K_{11}\overline{\Delta}_{AZ} + K_{12}\overline{\Delta}_{EL} \\ \frac{\partial}{\partial t}\hat{\underline{\omega}}_s^e = \frac{-2\dot{R}}{R}\hat{\underline{\omega}}_s^e + \frac{\overline{\underline{A}}^e \times \overline{\underline{i}}_s^e}{R} + K_{21}\overline{\Delta}_{AZ} + K_{22}\overline{\Delta}_{EL} \\ \frac{\partial}{\partial t}\overline{\underline{A}}_T^e = -\hat{\underline{\omega}}^e \times \hat{\underline{A}}_T^e + K_{31}\overline{\Delta}_{AZ} + K_{32}\overline{\Delta}_{EL} \end{array} \right\} \tag{12}$$

where $$\begin{bmatrix} \overline{\Delta}_{Az} \\ \overline{\Delta}_{EL} \end{bmatrix} = T \begin{bmatrix} \Delta_{Az} \\ \Delta_{EL} \end{bmatrix}$$

T is a transformation matrix from the antenna frame ($\Delta$) to the electronic 'e' frame ($\overline{\Delta}$).

$\Delta_{AZ}$, $\Delta_{EL}$ are the receiver outputs as defined in equations (3).

The Kalman gains $\underline{K}_{ij}$ are determined from the covariance matrix P. Thus:

$$K = PH'/\sigma^2 = \begin{bmatrix} K_{11} & K_{12} \\ K_{21} & K_{22} \\ K_{31} & K_{33} \end{bmatrix} \tag{13}$$

where H is the measurement matrix $$H = \begin{bmatrix} 0 & 1 & 0 & 0 & 0 & 0 & 0 \\ 0 & 0 & 1 & 0 & 0 & 0 & 0 \end{bmatrix} \tag{14}$$

$\sigma^2$ is the measurement noise spectral density $$\sigma^2 = \sigma_g^2 + \sigma_{TH}^2 \tag{15}$$

where
$\sigma_g^2$ and $\sigma_{TH}^2$ are glint and thermal noise spectral densities $$\sigma_g^2 = 2\sigma_{gL}^2/R^2\omega_{gL} \text{ rad}^2/\text{Hz} \tag{16}$$

$$\sigma_{TH}^2 = 2\pi\phi_s \text{ rad}^2/\text{Hz} \tag{17}$$

where
$\sigma_{gL}$ is the expected r.m.s glint in metres
R is the measured separation range in metres
$\omega_{gL}$ is the expected glint bandwidth in rad/sec
$\phi_s$ is the zero frequency spectral density at thermal noise
and $$\sigma_s = \frac{1}{4\pi B_s S_s^2 (1+\pi)} \text{rad}^2/\text{rad}/s \quad (18)$$

$B_s$ is the receiver bandwidth in Hz
$S_s$ is the antenna static split sensitivity in V/V/rad
$\Omega$ is the (signal power)/(noise power) measured in the receiver.

The covariance matrix P is found by solving the matrix Ricatti equation $$\dot{P} = FP + PF^t + Q - PH^tHP/\sigma^2 \quad (19)$$

where $$F = \begin{bmatrix} 0 & 0 & 0 & \hat{n}^e & -\hat{m}^e & 0 & 0 \\ 0 & 0 & 0 & 0 & \hat{l}^e & 0 & 0 \\ 0 & 0 & 0 & -\hat{l}^e & 0 & 0 & 0 \\ \frac{\hat{A}_z^e}{R} & 0 & \frac{-\hat{A}_x^e}{R} & \frac{-2\dot{R}}{R} & 0 & 0 & \frac{-\hat{l}^e}{R} \\ \frac{-\hat{A}_y^e}{R} & \frac{\hat{A}_x^e}{R} & 0 & 0 & \frac{-2\dot{R}}{R} & \frac{-\hat{l}^e}{R} & 0 \\ 0 & 0 & 0 & 0 & 0 & 0 & 0 \\ 0 & 0 & 0 & 0 & 0 & 0 & 0 \end{bmatrix} \quad (20)$$

The system noise spectral density matrix is usually chosen to be diagonal, i.e. Q=diag [Q1, Q2, Q3, Q4, Q5, Q6, Q7]. Simulation results have shown that if the Qi are chosen as follows:

Q1=Q2=Q3=Q4=Q5=0
Q6=Q7=100 $(m/s^2)^2$/Hz then satisfactory performance against both manoeuvring and non-manoeuvring aircraft targets is obtained.

Figure 4:
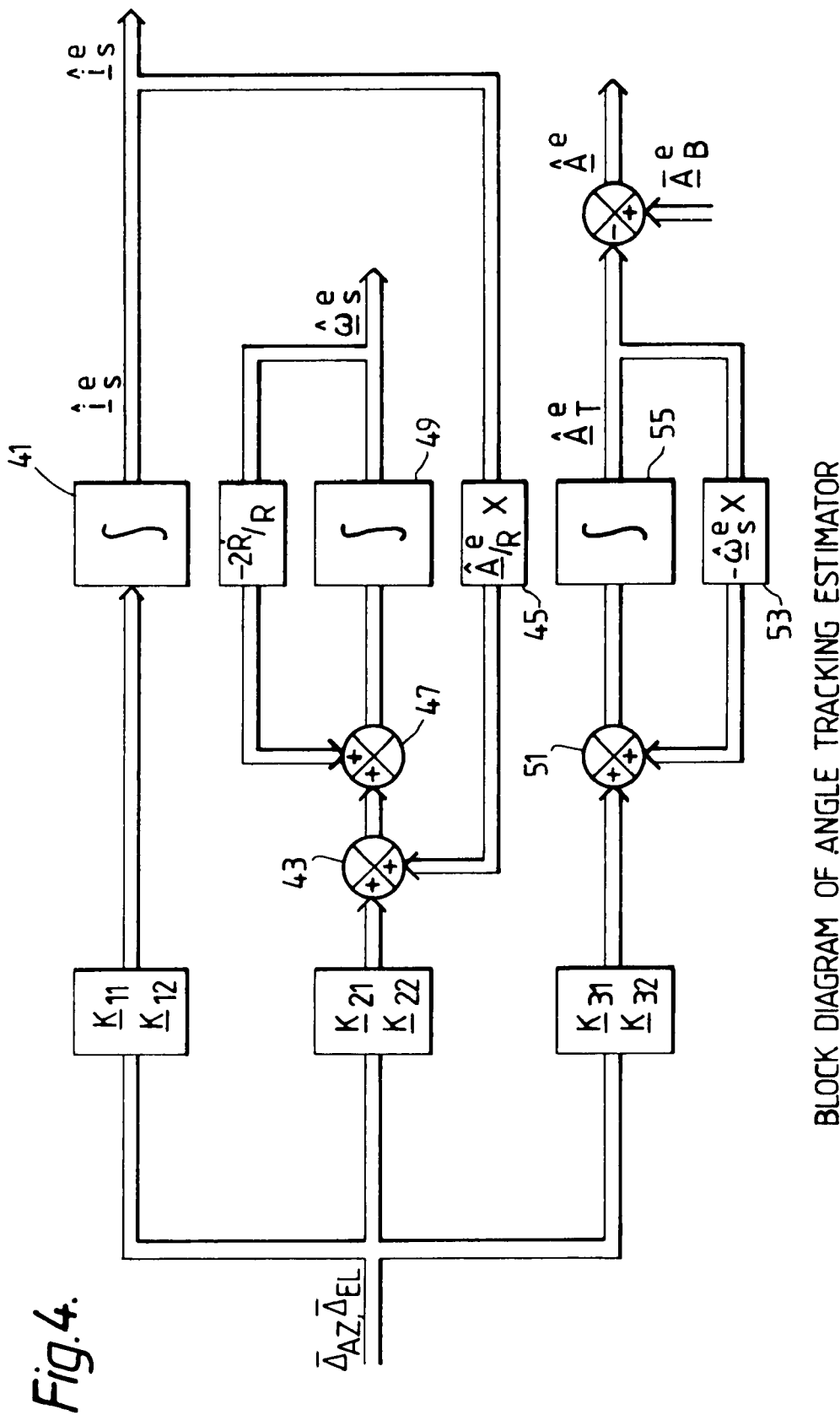
FIG. 4 is a block diagram of a recursive estimator based on a seven-state Kalman filter and suitable for use with body rate accelerometers and high quality gyros.

Equations (19) are solved on line in the angle tracking filter processor as the engagement progresses. The covariance matrix is initialised using our knowledge of the system. Only the diagonal terms (variances) are considered for initialisation since there is no useful knowledge of the off diagonal terms. The direction cosine variances are initialised according to our knowledge of the angular lay on accuracy, and the sightline rate covariances according to our knowledge of the sightline rate. Past experience has lead to the initialisation of the variance on target acceleration to zero to avoid any deviation from the initial target acceleration estimate until the other filter states have settled down. The filter states should be initialised to values close to the true value of the states as this minimises the mean square error and improves the overall system performance. In the event that at the start of an engagement insufficient information is available to initialise the filter states all the filter states should be set to zero except the estimate of sightline direction $\hat{i}^e$ which should be set to $|1,0,0|$ FIG. 4 is a block diagram of the estimator processes described above and particularly of the equations (12). The estimator is provided with the receiver outputs $\Delta_{AZ}$ & $\Delta_{EL}$ converted, as will be explained, into the electronic frame. These signals are subjected to the Kalman gains $\underline{K}_{ij}$ for the respective equations. Thus Kalman gains $\underline{K}_{11}$ & $\underline{K}_{12}$ followed by integration in process 41 produces the estimated sightline in the e frame $\hat{i}_s^e$.

For the second equation giving the sightline rate, the receiver outputs in e frame coordinates are multiplied by Kalman gains $\underline{K}_{21}$ & $\underline{K}_{22}$ and applied to summing process 43, the other input of which is the estimated sightline in the e frame in a vector cross product (process 45) with the quantity $\underline{\hat{A}}^e/R$. The result of this summation is applied to another summing process 47 where it is added to the product of the output sightline rate estimate $\hat{\underline{\omega}}^e$ and the approach velocity factor $2\dot{R}/R$. The result of this summation is integrated in process 49 to give the sightline rate estimate.

For the third equation the receiver outputs are processed similarly, by Kalman gains $K_{31}$ & $K_{32}$, and added, in process 51, to a vector cross product (53) of the sightline rate estimate and the target acceleration $\underline{\hat{A}}_T^e$. The sum is integrated in process 55 to product the target acceleration output.

Antenna Servo Demands

The two axis gimballed antenna is driven by servo motors to track the target in azimuth and elevation. The antenna servo is position controlled using angular inputs and the gimbal angle demands are derived from the outputs of the angle tracking estimator in the following manner. The angle tracking estimator provides an estimate of the target direction $\hat{\underline{i}}_s^e$. This vector is transformed into the body frame to obtain $\hat{\underline{i}}_s^B$.

$$\hat{\underline{i}}_s^B = E^T \hat{\underline{i}}_s^e \quad (21)$$

where $E^T$ is the transpose of the matrix E, given in equation (4). The vector $\hat{\underline{i}}_s^B$ has components $|\hat{l}^B, \hat{m}^B, \hat{n}^B|$ and the demanded gimbal angles can be obtained from these components.

The azimuth gimbal demand $\psi_{gD}$ is given by:

$$\psi_{gD} = \sin^{-1}[-\hat{n}^B] \quad (22)$$

The elevation gimbal demand $\theta_{gD}$ is given by:

$$\theta_{gD} = \tan^{-1}[\hat{m}^B/\hat{l}^B] \quad (23)$$

EAT Feedback Signals

As described earlier, the receiver outputs are a measure of the difference between the true and estimated sightline direction. The estimated sightline direction $\hat{\underline{i}}_s$ is derived in the angle tracking filter. The azimuth (elevation) EAT feedback signal is given by $\hat{\underline{i}}_s \cdot \underline{j}_a$ ($\hat{\underline{i}}_s \cdot \underline{k}_a$). These two signals can be conveniently obtained from the demanded and measured gimbal angles. The $\hat{\underline{i}}_s^B$ vector may be written in terms of the demanded gimbal angles $\psi_{gD}$, $\theta_{gD}$ as $$\hat{\underline{i}}_s^B = [\cos\theta_{gD} \cos\psi_{gd}, \cos\theta_{gD} \sin\psi_{gD}, -\sin\theta_{gD}] \quad (24)$$

and the $\underline{j}_a$, $\underline{k}_a$ vectors in terms of the measured gimbal angles $\psi_g$, $\theta_g$ as $$\underline{j}_a = [-\sin\psi_g, \cos\psi_g, 0] \quad (25)$$

$$\underline{k}_a = [\sin\theta_g \cos\psi_g, \sin\theta_g \sin\psi_g, \cos\theta_g] \quad (26)$$

Then $$\begin{aligned}\hat{\underline{i}}_s \cdot \underline{j}_a &= -\cos\theta_{gD} \cos\psi_{gD} \sin\psi_g + \cos\theta_{gD} \sin\psi_{gD} \cos\psi_g \quad (27)\\ &= \cos\theta_{gD} [\sin\psi_{gD} \cos\psi_g - \cos\psi_{gD} \sin\psi_g |\\ &= \cos\theta_{gD} \sin(\psi_{gD} - \psi_g)\\ &= \cos\theta_{gD} (\psi_{gD} - \psi_g)\end{aligned}$$

Similarly $\hat{\underline{i}}_s \cdot \underline{k}_a \simeq \theta_g - \theta_{gD}$ \quad (28)

Therefore the EAT feedback signals can be constructed easily since the error between the demanded and measured gimbal angles is directly available in the antenna servo system.

Transformation from Antenna to Electronic Axes Systems

The receiver output signals must be transformed into the electronic frame before they can be used in the estimation process. Define a vector $\Delta \underline{i}_s$ thus:

$$\Delta \underline{i}_s = \underline{i}_s - \hat{\underline{i}}_s$$

This vector can be written in terms of its components in the antenna system as $$\Delta \underline{i}_s^a = (\Delta \underline{i}_s \cdot \underline{i}_a)\underline{i}_a + (\Delta \underline{i}_s \cdot \underline{j}_a)\underline{j}_a + (\Delta \underline{i}_s \cdot \underline{k}_a)\underline{k}_a \quad (30)$$

and in terms of its components in the electronic frame as $$\Delta \underline{i}_s^e = (\Delta \underline{i}_s \cdot \underline{e}_1)\underline{e}_1 + (\Delta \underline{i}_s \cdot \underline{e}_2)\underline{e}_2 + (\Delta \underline{i}_s \cdot \underline{e}_3)\underline{e}_3 \quad (31)$$

The receiver measures two components of the $\Delta \underline{i}_s^a$ vector: the receiver's azimuth output $\Delta_{AZ}$ is $\Delta \underline{i}_s \cdot \underline{j}_a$ and the receiver's elevation output $\Delta_{EL}$ is $\Delta \underline{i}_s \cdot \underline{k}_a$. The inputs to the angle tracking estimator $\overline{\Delta}_{AZ}, \overline{\Delta}_{EL}$ are given by:

$$\overline{\Delta}_{AZ} = \Delta \underline{i}_s \cdot \underline{e}_2$$

$$\overline{\Delta}_{EL} = \Delta \underline{i}_s \cdot \underline{e}_3 \quad (32)$$

From equations (30, 31)

$$\Delta_{AZ} = (\Delta \underline{i}_s \cdot \underline{i}_a)\underline{i}_a \cdot \underline{e}_2 + (\Delta \underline{i}_s \cdot \underline{j}_a)\underline{j}_a \cdot \underline{e}_2 + (\Delta \underline{i}_s \cdot \underline{k}_a)\underline{k}_a \cdot \underline{e}_2$$

$$= (\Delta \underline{i}_s \cdot \underline{i}_a)\underline{i}_a \cdot \underline{e}_2 + \Delta_{AZ}\underline{j}_a \cdot \underline{e}_2 + \Delta_{EL}\underline{k}_a \cdot \underline{e}_2$$

Now $\Delta \underline{i}_s \cdot \underline{i}_a$ and $\underline{i}_a \cdot \underline{e}_2$ are both small quantities Therefore $$\overline{\Delta}_{AZ} \approx \Delta_{AZ}\underline{j}_a \cdot \underline{e}_2 + \Delta_{EL}\underline{k}_a \cdot \underline{e}_2 \quad (33)$$

and similarly $$\overline{\Delta}_{EL} \approx \Delta_{AZ}\underline{j}_a \cdot \underline{e}_3 + \Delta_{EL}\underline{k}_a \cdot \underline{e}_3 \quad (34)$$

This can be written as $$\begin{bmatrix} \overline{\Delta}_{AZ} \\ \overline{\Delta}_{EL} \end{bmatrix} = \begin{bmatrix} \underline{j}_a \cdot \underline{e}_2 & \underline{k}_a \cdot \underline{e}_2 \\ \underline{j}_a \cdot \underline{e}_3 & \underline{k}_a \cdot \underline{e}_3 \end{bmatrix} \begin{bmatrix} AZ \\ EL \end{bmatrix} \quad (35)$$

Figure 3:
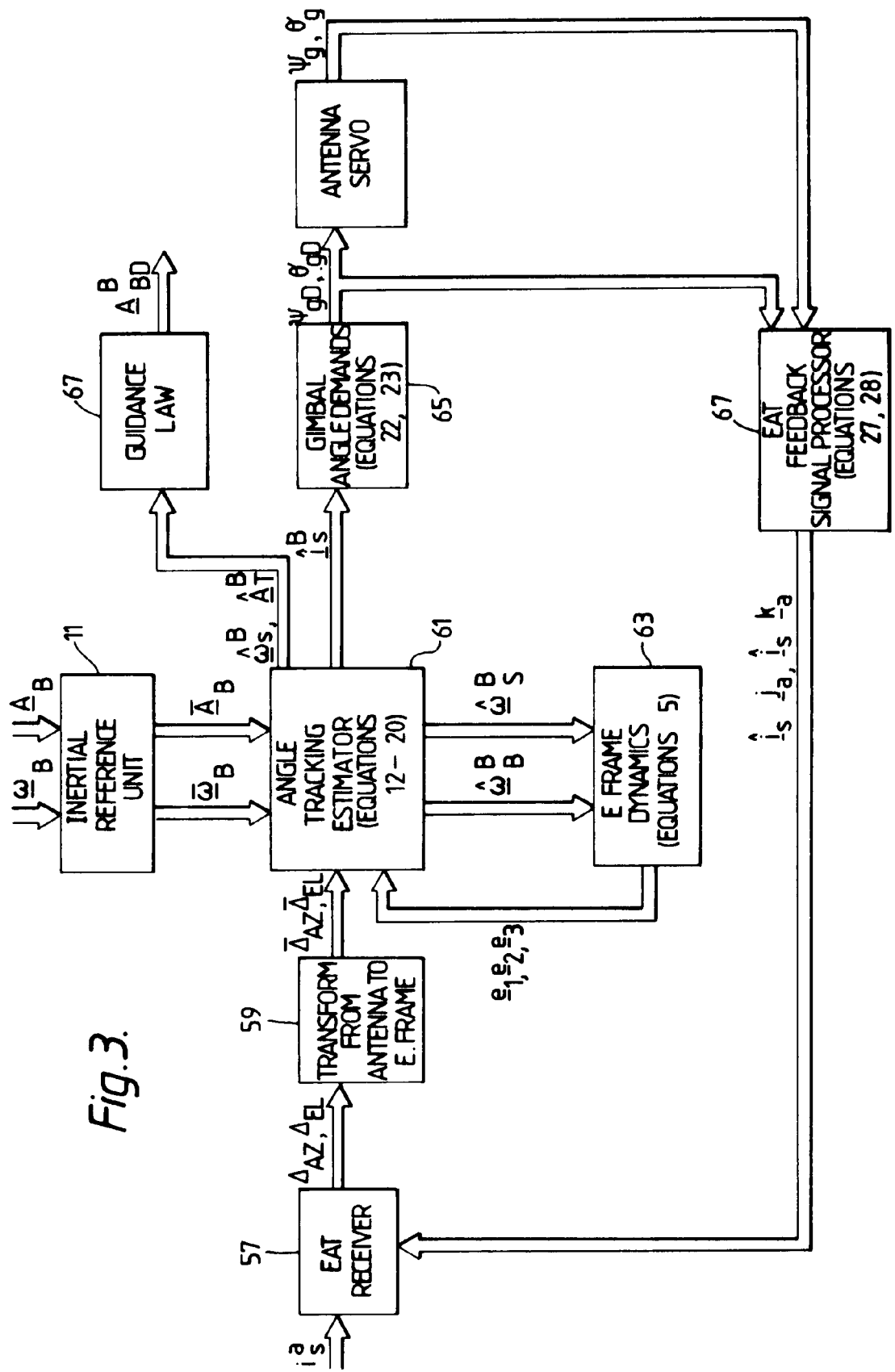
FIG. 3 is a block diagram of the angle tracking system hardware and processes.

FIG. 3 shows a schematic block diagram of the angle tracking system whose theory is detailed above. The receiver 57 (also shown in FIG. 2) outputs $\Delta_{AZ}, \Delta_{EL}$ in the antenna frame are transformed into the electronic frame, using equations (35) in sub-system (59) to give $\overline{\Delta}_{AZ}, \overline{\Delta}_{EL}$. These signals are then processed in sub-system 61, which includes the estimator of FIG. 4, together with the receiver's estimates of range, velocity and signal to noise ratio, with the IRU measurements of the missile's body rate $\underline{\omega}_B$ and accelerations $\underline{A}_B$ to produce estimates of the sightline direction $\hat{\underline{i}}^e$, the sightline rate $\hat{\underline{\omega}}^e$ and the target acceleration normal to the sightline $\hat{\underline{A}}_T^e$ illustrated in FIG. 4. These outputs are converted within the sub-system 61 into body frame coordinates, i.e., $\hat{\underline{i}}_s^B, \hat{\underline{\omega}}_s^B$ & $\hat{\underline{A}}_T^B$, which then feed the 'e' frame dynamics processor 63, the gimbal demand (65) processor and the guidance unit processors (67). The EAT feedback signals to the EAT receiver are obtained from the demanded and measured gimbal angles as shown in equations (27) & (28) in additional digital circuits 67.

Certain classes of target are unlikely to manoeuvre significantly. For these targets a simplified version of the angle tracking filter may be constructed as follows. The target acceleration states $\hat{\underline{A}}_T$ are deleted from the state space description and the number of states in the filter is reduced to five. The filter equations can be further simplified by omitting the measured missile acceleration terms of equations (12) and (20). The resulting filter design requires three rate gyroscopes and no accelerometers in the IRU.

Modification to Correct for Gyro Scale Factor Errors

The estimator equations given in the previous section assumed that expensive rate gyros were used in the inertial reference unit. The extension of the design to compensate for lower quality instruments will now be considered. The dominant errors of the rate gyros are assumed to be scale factor errors and bias drift. The scale factor errors are likely to have the most detrimental effect on the guidance systems and therefore it is necessary to design compensation for the scale factor errors.

The angular velocity of the 'e' frame with respect to inertial space $\underline{\omega}_E$ is $$\underline{\omega}_E = \underline{\omega}_B + \underline{\omega}_{EB} \quad (41)$$

where $\underline{\omega}_B$ is the angular velocity of the body wrt inertial space
$\underline{\omega}_{EB}$ is the angular velocity of the 'e' frame wrt the body.

If $$\underline{\omega}_{EB} = -\underline{\omega}_B + \underline{\omega}_s \quad (42)$$

then the 'e' frame will rotate at an angular velocity $\underline{\omega}_s$ with respect to inertial space. However, $\underline{\omega}_B$ & $\underline{\omega}_s$ are not known but there is a measure of body rate $\overline{\underline{\omega}}_B$ from the strapdown gyros and an estimate of the sightline rate $\hat{\underline{\omega}}_s$ from the angle tracking filter.

Therefore we could set $$\underline{\omega}_{EB} = -\overline{\underline{\omega}}_B + \hat{\underline{\omega}}_s \quad (43)$$

but if $\overline{\underline{\omega}}_B \neq \underline{\omega}_B$ then errors will be produced in the estimation process. The angle tracking system is generally more sensitive to pitch and yaw gyro errors than errors in the roll gyro.

Assume that $$\underline{\omega}_B = \overline{\underline{\omega}}_B + \mu_2 \overline{q}_B \underline{k}_2 + \mu_3 \overline{r}_B \underline{k}_3 \quad (44)$$

where $\underline{\omega}_B$ is the true body rate
$\overline{\underline{\omega}}_B = (\overline{p}_B, \overline{q}_B, \overline{r}_B)$ is the measured body rate
$\underline{k}_2, \underline{k}_3$ are unit vectors along the sensitive axes of the pitch and yaw gyros respectively.
$\mu_2, \mu_3$ represent the scale factor error on the pitch and yaw gyros. Then an estimate of the true body rate is $$\hat{\underline{\omega}}_B = \overline{\underline{\omega}}_B + \hat{\mu}_2 \overline{q}_B \underline{k}_2 + \hat{\mu}_3 \overline{r}_B \underline{k}_3 \quad (45)$$

The angular velocity of the 'e' frame with respect to inertial space is $$\underline{\omega}_E = \underline{\omega}_B - \hat{\underline{\omega}}_B + \hat{\underline{\omega}}_s \quad (46)$$

The estimate of $\underline{\omega}_E$, $\hat{\underline{\omega}}_E$ is given by $$\underline{\omega}_E = \hat{\underline{\omega}}_B - \hat{\underline{\omega}}_B + \hat{\underline{\omega}}_s = \hat{\underline{\omega}}_s \quad (46)$$

Using the above equations the filter described above can be expanded to include two extra gyro scale factor states $\mu_2$ and $\mu_3$. The equations for this expanded estimator are as follows.

$$\left.\begin{array}{l}\dfrac{\partial \hat{i}_s^e}{\partial t} = \underline{0} + K_{11}\overline{\Delta}_{AZ} + K_{12}\overline{\Delta}_{EL} \\ \dfrac{\partial \hat{\omega}_s^e}{\partial t} = \dfrac{-2\dot{R}}{R}\hat{\omega}_s^e + \dfrac{\hat{A}^e \times \hat{i}_s}{R} + K_{21}\overline{\Delta}_{AZ} + K_{22}\overline{\Delta}_{EL} \\ \dfrac{\partial \hat{A}_T^e}{\partial t} = -\hat{\omega}_s^e \times \overline{A}_T^e + K_{31}\overline{\Delta}_{AZ} + K_{32}\overline{\Delta}_{EL} \\ \dfrac{\partial \hat{\mu}_2}{\partial t} = 0 + K_{41}\overline{\Delta}_{AZ} + K_{42}\overline{\Delta}_{EL} \\ \dfrac{\partial \hat{\mu}_3}{\partial t} = 0 + \underline{K}_{51}\overline{\Delta}_{AZ} + \underline{K}_{52}\overline{\Delta}_{EL}\end{array}\right\} \quad (48)$$

The Kalman gains $\underline{K}_{ij}$ are given by $$K = \begin{bmatrix} K_{11} & K_{12} \\ K_{21} & K_{22} \\ K_{31} & K_{32} \\ K_{41} & K_{42} \\ K_{51} & K_{52} \end{bmatrix} = PH^t/\sigma^2 \quad (49)$$

where the covariance matrix P is obtained from solving the matrix Ricatti equation $$\dot{P} = AP + PA^t + Q - PH^tHP/\sigma^2 \quad (50)$$

and Q the system noise spectral density matrix is a diagonal matrix $$Q = \text{diag}|Q1, Q2, Q3, Q4, Q5, Q6, Q7, Q8, Q9|$$

$$H = \begin{bmatrix} 0 & 1 & 0 & 0 & 0 & 0 & 0 & 0 & 0 \\ 0 & 0 & 1 & 0 & 0 & 0 & 0 & 0 & 0 \end{bmatrix}$$

$\sigma^2$ is the expected measurement noise spectral density as defined in Equation 15.

The matrix A is:

$$\begin{bmatrix} 0 & 0 & 0 & \hat{n}^e & -\hat{m}^e & 0 & 0 & -\overline{q}_B(E_{22}\hat{n}^e - E_{32}\hat{m}^e) & -\overline{r}_B(E_{23}\hat{n}^e - E_{33}m^e) \\ 0 & 0 & 0 & 0 & \hat{l}^e & 0 & 0 & -\overline{q}_B(E_{32}\hat{l}^e - E_{12}\hat{n}^e) & -\overline{r}_B(E_{33}\hat{l}^e - E_{13}n^e) \\ 0 & 0 & 0 & -\hat{l}^e & 0 & 0 & 0 & -\overline{q}_B(E_{12}\hat{m}^e - E_{22}\hat{l}^e) & -\overline{r}_B(E_{13}\hat{m}^e - E_{23}l^e) \\ \dfrac{\hat{A}_z^e}{R} & 0 & \dfrac{-\hat{A}_x^e}{R} & \dfrac{-2\dot{R}}{R} & 0 & 0 & \dfrac{\hat{l}^e}{R} & -\overline{q}_B(E_{12}\hat{r}_s^e) & -\overline{r}_B(-E_{13}\hat{r}_s^e) \\ \dfrac{\hat{A}_y^e}{R} & \dfrac{\hat{A}_y^e}{R} & 0 & & \dfrac{-2\dot{R}}{R} & \dfrac{-\hat{l}^e}{R} & 0 & -\overline{q}_B(E_{12}\hat{q}_s^e) & -\overline{r}_B(E_{13}\hat{q}_s^e) \\ 0 & 0 & 0 & 0 & 0 & 0 & 0 & -\overline{q}_B(E_{12}\hat{A}_{T_z}^e) & -\overline{r}_B(-E_{13}\hat{A}_{T_z}^e) \\ 0 & 0 & 0 & 0 & 0 & 0 & 0 & -\overline{q}_B(E_{12}\hat{A}_{T_y}^e) & -\overline{r}_B(-E_{13}\hat{A}_{T_y}^e) \\ 0 & 0 & 0 & 0 & 0 & 0 & 0 & 0 & 0 \\ 0 & 0 & 0 & 0 & 0 & 0 & 0 & 0 & 0 \end{bmatrix}$$

The filter states are initialised in a similar manner as discussed previously, except that the initial values of the gyro scale factor error states $\mu_2$, $\mu_3$ are set to zero. The initial conditions on the matrix Ricatti equation are as before except that the variances on the gyro states are initialised according to the quality of the strapdown gyros.

Figure 5:
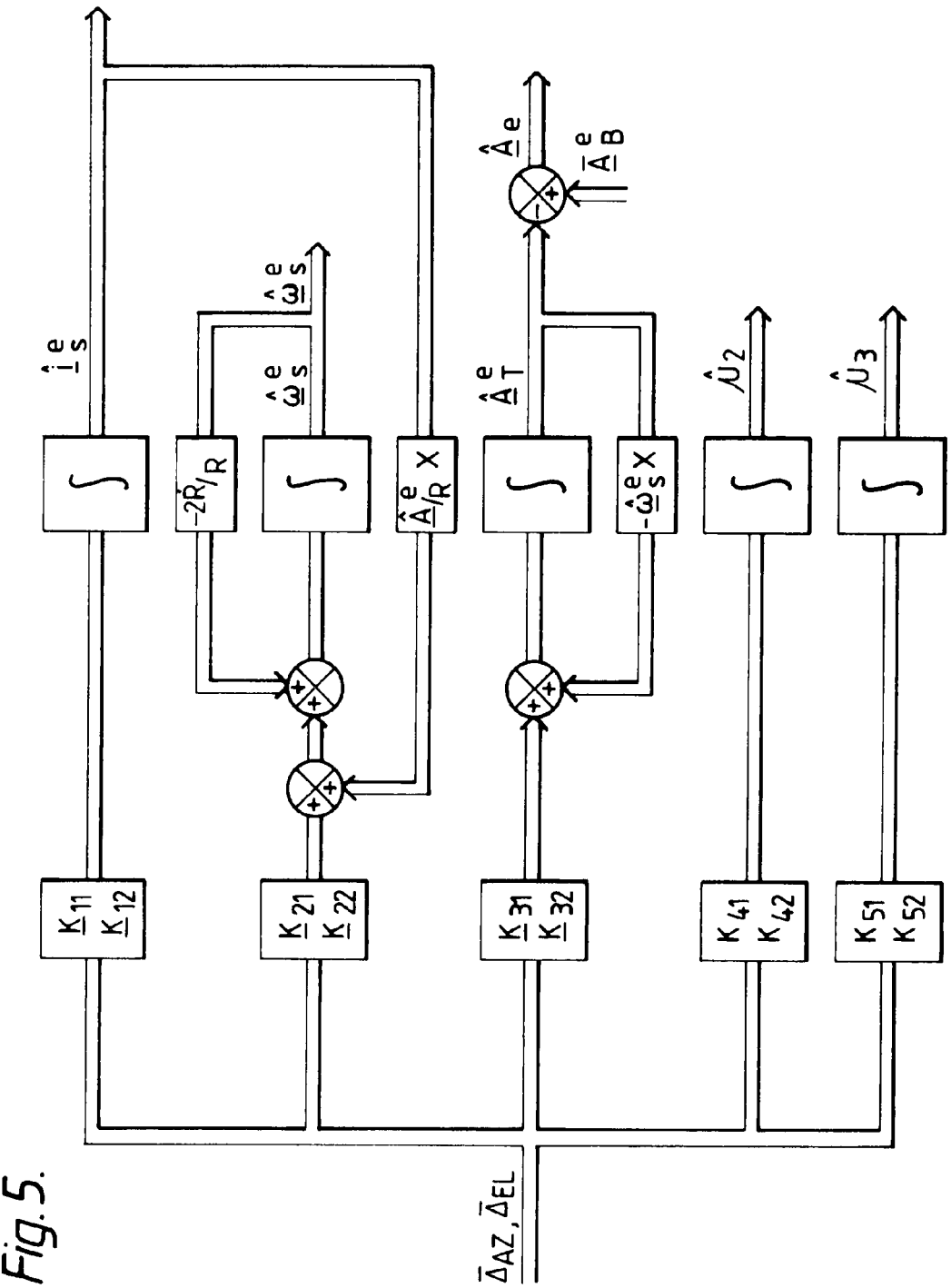
FIG. 5 is a similar block diagram of an estimator which takes account of errors in lesser quality gyros.

In FIG. 3, the estimator block 61 can thus be replaced by the modified design described in equations (47) to (50). These equations are implemented either in digital circuits or using a microprocessor computer program. A block diagram of the extended estimator is presented in FIG. 5.

Modifications to Correct for Receiver Errors

Receiver scale factor errors and radome aberation are potential source of guidance problems. The basic design of the angle tracking estimator may be developed to include extra states which compensate for these errors. It was assumed above that the EAT receiver produces outputs proportional to the difference between the m and n components of the sightline vector and their estimates m and n, corrupted by gaussian measurement noise. Radome aberration and receiver channel mismatches may result in receiver outputs which are not directly related to the sightline vector and these erroneous measurements could lead to poor estimates of the sightline rate.

To overcome this problem the filter equations may be extended as follows

Let $$\underline{a}_s = \underline{i}_w + \lambda_2 \underline{e}_2 + \lambda_3 \quad (51)$$

where
  $\underline{i}_s$ is a unit vector along the true missile target sightline
  $\underline{e}_2$, $\underline{e}_3$ are two vectors in the electronic frame
  $\lambda_2$, $\lambda_3$ are the unknown biases introduced by randome aberration and receiver errors The seeker's EAT outputs can be defined in terms of the $\underline{a}_s$ vector, and its estimate $\underline{\delta}_s$ $$\Delta_{Az} = f(\underline{j}_a \cdot \underline{a}_s - \underline{j}_a \cdot \underline{\delta}_s) \quad (52)$$

$$\Delta_{EL} = f(\underline{k}_a \cdot \underline{a}_s - \underline{k}_a \cdot \underline{\delta}_s)$$

where $\underline{j}_a$, $\underline{k}_a$ define the direction of the y and z antenna axes.

For small angular errors $$\Delta_{Az} = (\underline{j}_a \cdot \underline{a}_s - \underline{j}_a \cdot \underline{\delta}_s)$$

$$\Delta_{EL} = (\underline{k}_a \cdot \underline{a}_s - \underline{k}_a \cdot \underline{\delta}_s)$$

The differential errors $\Delta_{Az}$, $\Delta_{EL}$ are then transformed into the 'e' frame using the transformation matrix given in equation (34).

$$\begin{bmatrix} \overline{\Delta}_{AZ} \\ \overline{\Delta}_{EL} \end{bmatrix} = T \begin{bmatrix} \Delta_{Az} \\ \Delta_{EL} \end{bmatrix}$$

The estimator equations for this expanded filter are:

$$\frac{\partial \hat{l}_s^e}{\partial t} = \underline{0} + \underline{K}_{11}\overline{\Delta}_{AZ} + \underline{K}_{12}\overline{\Delta}_{EL} \quad (54)$$

$$\frac{\partial \hat{\omega}^e}{\partial t} = \frac{-2\dot{R}}{R}\hat{\omega}_s^e + \frac{\hat{A}^e \times \hat{l}_s^e}{R} + \underline{K}_{21}\overline{\Delta}_{AZ} + \underline{K}_{22}\overline{\Delta}_{EL}$$

$$\frac{\partial \hat{\underline{A}}_T^e}{\partial t} = -\hat{\underline{\omega}}_s^e \times \hat{\underline{A}}^e + \underline{K}_{31}\overline{\Delta}_{AZ} + \underline{K}_{32}\overline{\Delta}_{EL}$$

$$\frac{\partial \lambda_2}{\partial t} = 0 + \underline{K}_{41}\overline{\Delta}_{AZ} + \underline{K}_{42}\overline{\Delta}_{EL}$$

$$\frac{\partial \lambda_3}{\partial t} = 0 + \underline{K}_{51}\overline{\Delta}_{AZ} + \underline{K}_{52}\overline{\Delta}_{EL} \quad (55)$$

$$\hat{a}_s^e = \hat{l}_s^e + \hat{\lambda}_2 e_2 + \hat{\lambda}_3 e_3$$

The Kalman gain matrix $$K = \begin{bmatrix} \underline{K}_{11} & \underline{K}_{12} \\ \underline{K}_{21} & \underline{K}_{22} \\ \underline{K}_{31} & \underline{K}_{32} \\ \underline{K}_{41} & \underline{K}_{42} \\ \underline{K}_{51} & \underline{K}_{52} \end{bmatrix}$$

is given by $$K = PH^t/\sigma^2 \quad (56)$$

where the covariance matrix P is obtained by solving the following matrix Ricatti equations:

$$\dot{P} = AP + PA^t + Q - PH^t HP/\sigma^2 \quad (57)$$

$$\begin{bmatrix} 0 & 0 & 0 & \hat{n}^e & -\hat{m}^e & 0 & 0 & 0 & 0 \\ 0 & 0 & 0 & 0 & \hat{l}^e & 0 & 0 & 0 & 0 \\ 0 & 0 & 0 & -\hat{l}^e & 0 & 0 & 0 & 0 & 0 \\ \frac{-\hat{A}_y^e}{R} & \frac{\hat{A}_x^e}{R} & 0 & 0 & \frac{-2\dot{R}}{R} & \frac{-1^e}{R} & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix} \quad (58)$$

Q=diagonal [Q1, Q2, Q3, Q4, Q5, Q6, Q7, Q8, Q9], where $Q_i$ i=1, to-9 are the system noise spectral densities
$\sigma^2$ is the assumed measurement noise spectral density defined in equation (15)

$$H = \begin{bmatrix} 0 & 1 & 0 & 0 & 0 & 0 & 0 & 0 & 0 \\ 0 & 0 & 1 & 0 & 0 & 0 & 0 & 0 & 0 \end{bmatrix} \quad (59)$$

The filter equations are initialised in a similar manner as discussed previously, except that the initial values of the receiver error states $\lambda_2, \lambda_3$ are set to zero. The initial conditions on the matrix Ricatti equations are as before except that the variances on the receiver error states are initialised using the expected values of the receiver errors and radome aberration.

The invention claimed is:

1. An angle tracking radar system for a target-seeking missile having a body and a steerable beam antenna, the system comprising:
    (a) a receiver responsive to target signals received by said antenna to provide receiver output signals indicative of target direction;
    (b) processing means including a recursive estimator;
    (c) an inertial reference unit fixed relative to the body of the missile, and operative for producing body rate signals;
    (d) said processing means being responsive to said receiver output signals and to said body rate signals produced by said inertial reference unit for providing
        (i) an estimate of target sightline direction and angular velocity and
        (ii) an estimate of target acceleration for guiding the missile and steering the antenna beam onto the target;
    (e) said processing means converting said body rate signals and said receiver output signals into signals in an electronic frame, said electronic frame having orthogonal coordinates which are controlled in dependence upon said body rate signals and said sightline angular velocity estimate to produce alignment of one of said coordinates and said estimated sightline; and
    (f) all of said estimates of sightline and angular velocity being derived in said electronic frame coordinates for missile guidance control.

2. A radar system according to claim 1, wherein said antenna is gimbal mounted and said target sightline estimate is used to control the antenna to tend to align the antenna boresight and the sightline estimate.

3. A radar system according to claim 2, wherein said inertial reference unit includes accelerometer means to measure the missile body acceleration, the recursive estimator being responsive to measured body acceleration to provide an estimate of target acceleration for use in guiding said missile.

4. A radar system according to claim 1, wherein said estimator comprises a seven state extended Kalman filter.

5. A radar system according to claim 1, wherein said inertial reference unit consists of rate gyros and said estimator comprises a five state extended Kalman filter.

6. A radar system according to claim 1, wherein said inertial reference unit comprises pitch and yaw rate gyros and said body rate signal produced by said inertial reference unit includes scale factor error components in respect of said gyros, said estimator comprising a Kalman filter, said scale factor error components constituting two state vectors.

7. A radar system according to claim 1, wherein said receiver output signals include receiver scale factor and radome aberration error components, said estimator comprising a Kalman filter and said receiver and radome error components constituting two state vectors.

* * * * *